United States Patent
Hack et al.

(10) Patent No.: US 10,318,199 B2
(45) Date of Patent: Jun. 11, 2019

(54) SYSTEM, METHOD, AND RECORDING MEDIUM FOR REDUCING MEMORY CONSUMPTION FOR IN-MEMORY DATA STORES

(71) Applicant: International Business Machines Corporation, Armonk, NY (US)

(72) Inventors: Michel H. T. Hack, Cortlandt Manor, NY (US); Yufei Ren, Somers, NY (US); Yandong Wang, Elmsford, NY (US); Xingbo Wu, Yorktown Heights, NY (US); Li Zhang, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 62 days.

(21) Appl. No.: 14/945,031

(22) Filed: Nov. 18, 2015

(65) Prior Publication Data
US 2017/0139596 A1 May 18, 2017

(51) Int. Cl.
*G06F 3/06* (2006.01)
*G06F 12/0802* (2016.01)

(52) U.S. Cl.
CPC ............ *G06F 3/064* (2013.01); *G06F 3/0608* (2013.01); *G06F 3/0638* (2013.01); *G06F 3/0673* (2013.01); *G06F 12/0802* (2013.01); *G06F 2212/60* (2013.01)

(58) Field of Classification Search
CPC ...... G06F 3/064; G06F 3/0643; G06F 3/0604; G06F 3/0673; G06F 12/0802; G06F 2212/60
See application file for complete search history.

(56) References Cited

U.S. PATENT DOCUMENTS

| | | | |
|---|---|---|---|
| 6,778,530 B1 | 8/2004 | Greene | |
| 7,373,354 B2 | 5/2008 | Dittrich et al. | |
| 7,548,928 B1 * | 6/2009 | Dean | G06F 17/30985 |
| 8,675,648 B1 * | 3/2014 | Goel | H04L 49/10 370/389 |
| 9,069,810 B2 * | 6/2015 | Kim | G06F 17/3033 |
| 2010/0199109 A1 * | 8/2010 | Terek | G06F 3/0608 713/194 |
| 2013/0246372 A1 * | 9/2013 | Rao | G06F 17/3015 707/692 |
| 2016/0077980 A1 * | 3/2016 | Tomlin | G06F 17/30286 711/135 |

OTHER PUBLICATIONS

Son, et al. "Authenticated Flooding in Large-scale Sensor Networks" Mobile Adhoc and Sensor Systems Conference, 2005. IEEE International Conference on IEEE, 2005.

(Continued)

*Primary Examiner* — Michael Alsip
(74) *Attorney, Agent, or Firm* — Rahan Uddin, Esq.; McGinn IP Law Group, PLLC

(57) ABSTRACT

A method for compressing a group of key-value pairs, the method including dividing the group of key-value pairs into a plurality of segments, creating a plurality of blocks, each block of the plurality of blocks corresponding to a segment of the plurality of segments, and compressing each block of the plurality of blocks.

11 Claims, 15 Drawing Sheets

(56) References Cited

OTHER PUBLICATIONS

Yuan, et al. "Efficient Unrestricted Identity-Based Aggregate Signature Scheme". PLOS (2014): e110100.
Yang, et al. "High-Performance Operating System Controlled Online Memory Compression". ACM Transactions on Embedded Computing Systems (TECS) 9.4 (2010): 30.
Yee, "Cache Design for a Hardware Accelerated Sparse Texture Storage System". Thesis, University of Waterloo (2004).

* cited by examiner

KEY-VALUE pair COMPRESSION METHOD 1000

SYSTEM, METHOD, AND RECORDING MEDIUM FOR REDUCING MEMORY CONSUMPTION FOR IN-MEMORY DATA STORES

BACKGROUND

The present invention relates generally to compression of in-memory data stores, and more particularly, but not by way of limitation, to a system, a method, and a recording medium for reducing memory consumption for in-memory data stores.

Conventional in-memory, key-value pair systems consume memory from indexing data structures in which, for each key-value pair, an index entry is created, and it requires a space within the indexing structure to store each entry. Memory is consumed from the memory store for each of the key-value items in which the conventional systems store received data as it is within the storage area without resorting to a compression mechanism.

Other conventional in-memory, key-value systems aim to combine data deduplication with compression to reduce the storage footprint for the file systems. However, such systems require a two-step method to reduce storage consumptions in which a file must be partitioned into multiple segments and then many restrictions must be followed to choose which segments would be compressed together.

Other conventional in-memory, key-value systems merely include a database in which the systems aim to reduce the number of columns within the database by finding and eliminating functionally dependent columns. However, such conventional systems are limited by the similarity detected since the system is based on the assumption that rows must have a certain extent of similarity such that a single row can be used as the representative row while the others can be removed.

However, each conventional in-memory, key-value system above, and all other conventional in-memory key-value systems are limited in their application in that they do not consider packing, via a server, data according to certain conditions and compressing continuous key-value pairs to generate blocks, managing the primary indexing structure of the blocks instead of entries for each of the individual key-value pairs, and offloading the block decompression to a front-end server such that the back-end server can return the block that contains the requested key without decompression.

That is, there is a technical problem in the conventional systems that indexing data by conducting an exact lookup increases the size of indexing data structures (i.e., individual key-value pairs) and storing received data in the form in which it is received (i.e., each key-value pair individually) which consumes a lot of metadata.

SUMMARY

In an exemplary embodiment, the present invention can provide a method for compressing a group of key-value pairs, the method including dividing the group of key-value pairs into a plurality of segments, creating a plurality of blocks, each block of the plurality of blocks corresponding to a segment of the plurality of segments, and compressing each block of the plurality of blocks.

Further, in another exemplary embodiment, the present invention can provide a non-transitory computer-readable recording medium recording a compression program for compressing a group of key-value pairs, the program causing a computer to perform dividing the group of key-value pairs into a plurality of segments, creating a plurality of blocks, each block of the plurality of blocks corresponding to a segment of the plurality of segments, and compressing each block of the plurality of blocks.

Even further, in another exemplary embodiment, the present invention can provide a key-value pair compression system for compressing a group of key-value pairs, the system including a key-value pair dividing division device configured to divide the group of key-value pairs into a plurality of segments, a block creation device configured to create a plurality of blocks, each block of the plurality of blocks corresponding to a segment of the plurality of segments, and a block compression device configured to compress each block of the plurality of blocks.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
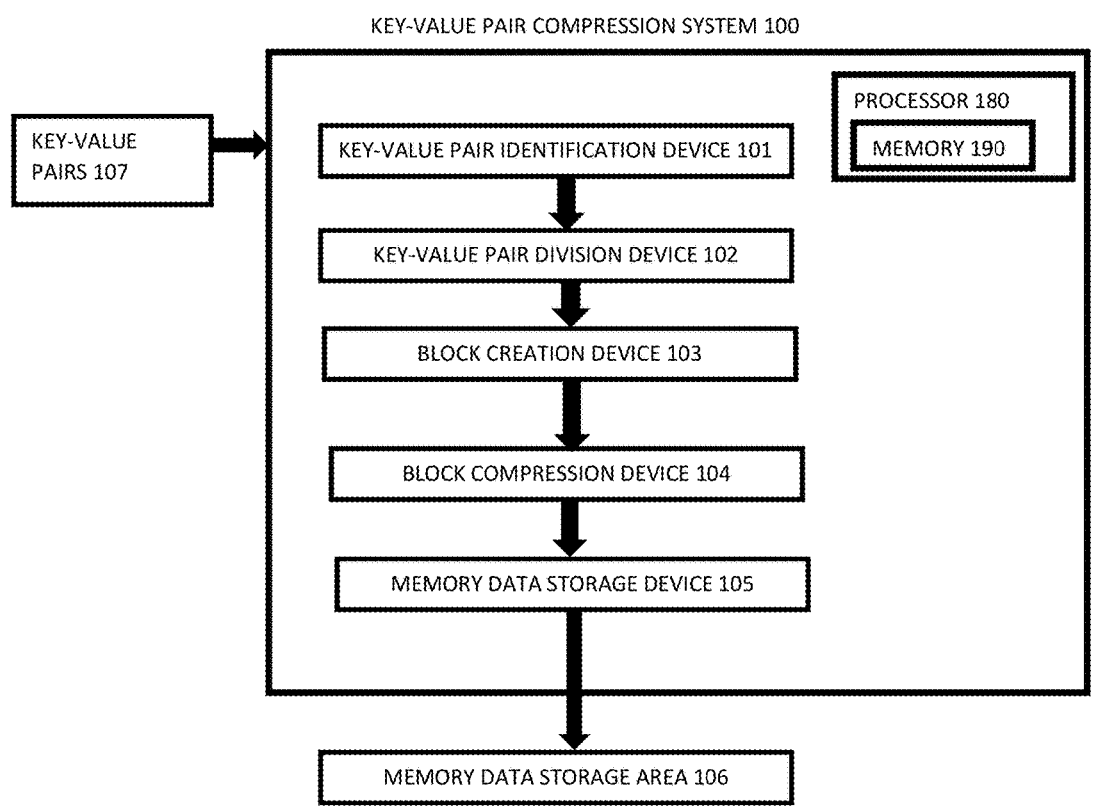
FIG. 1 exemplarily shows a block diagram illustrating a configuration of a key-value pair compression system 100.

The invention will now be described with reference to FIGS. 1-15, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

With reference now to FIG. 1, the key-value pair compression system 100 includes a key-value pair identification device 101, a key-value pair division device 102, a block creation device 103, a block compression device 104, and a memory storage device 105. The key-value pair compression system 100 receiving a plurality of key-value pairs 107 as an input for the key-value pair compression system 100 to convert into blocks and store in a memory data storage area 106. The key-value pair compression system 100 includes a processor 180 and a memory 190, with the memory 190 storing instructions to cause the processor 180 to execute each device of the key-value pair compression system 100.

Figure 13:
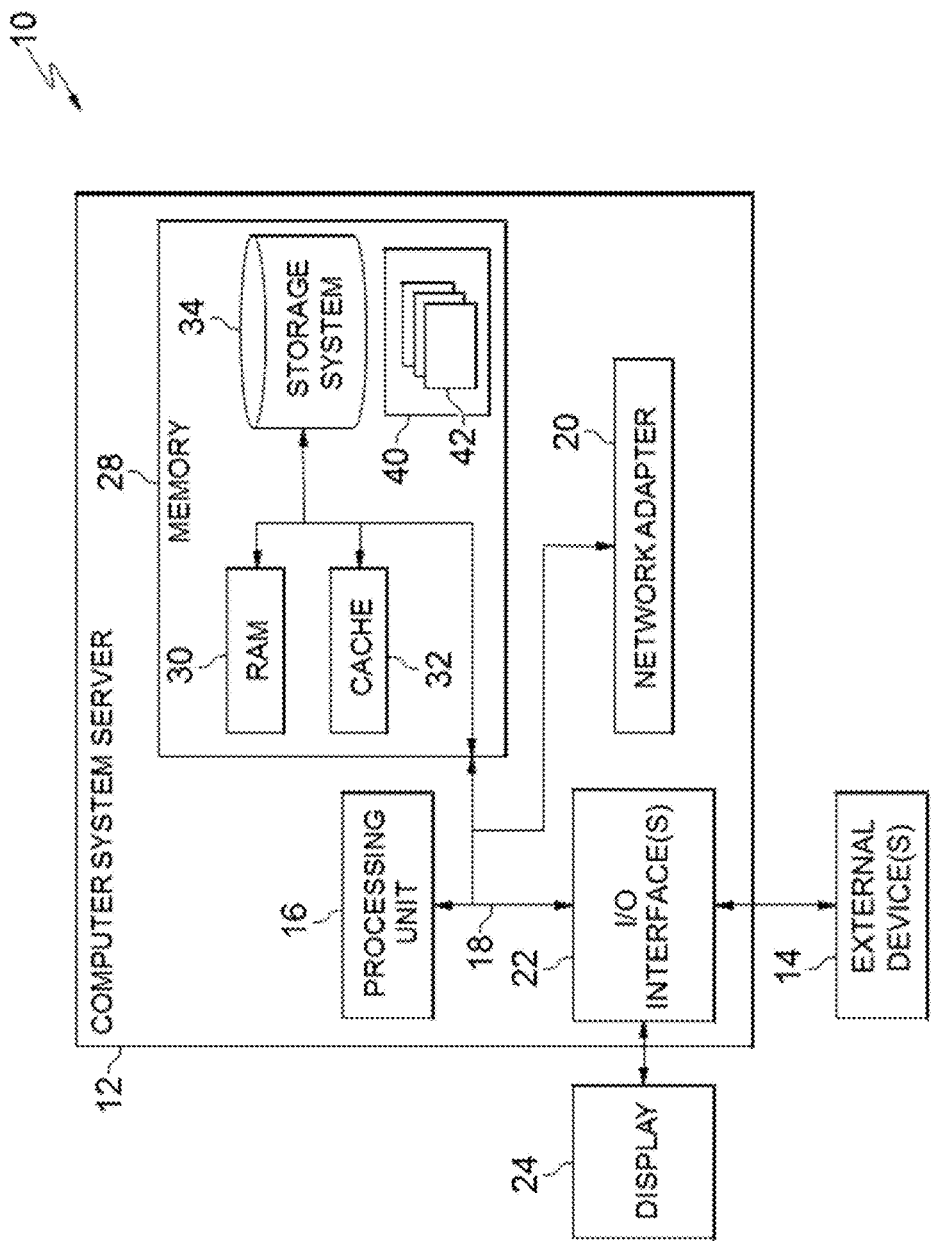
FIG. 13 depicts a cloud computing node according to an embodiment of the present invention.
Figure 14:
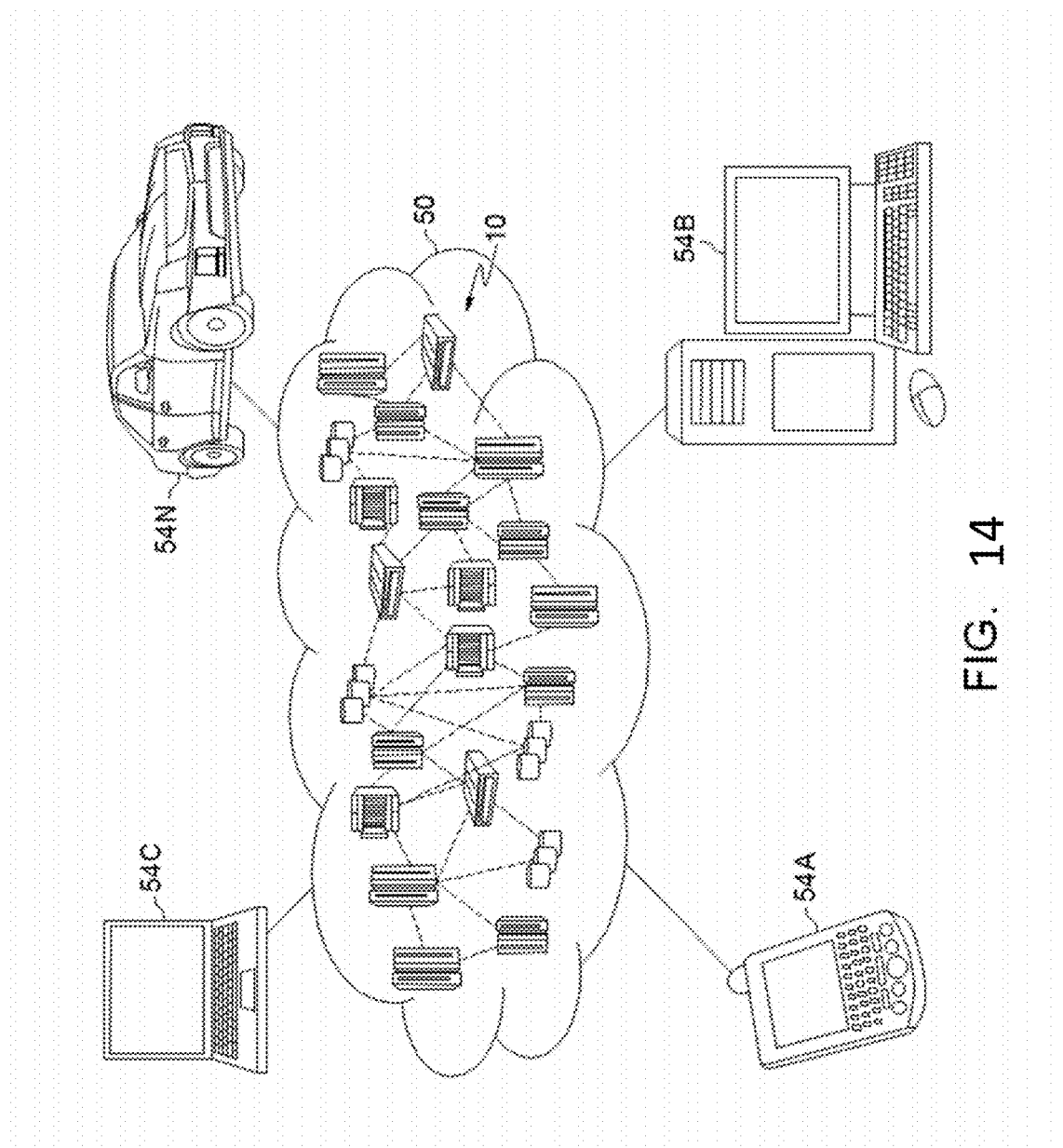
FIG. 14 depicts a cloud computing environment according to another embodiment of the present invention.
Figure 15:
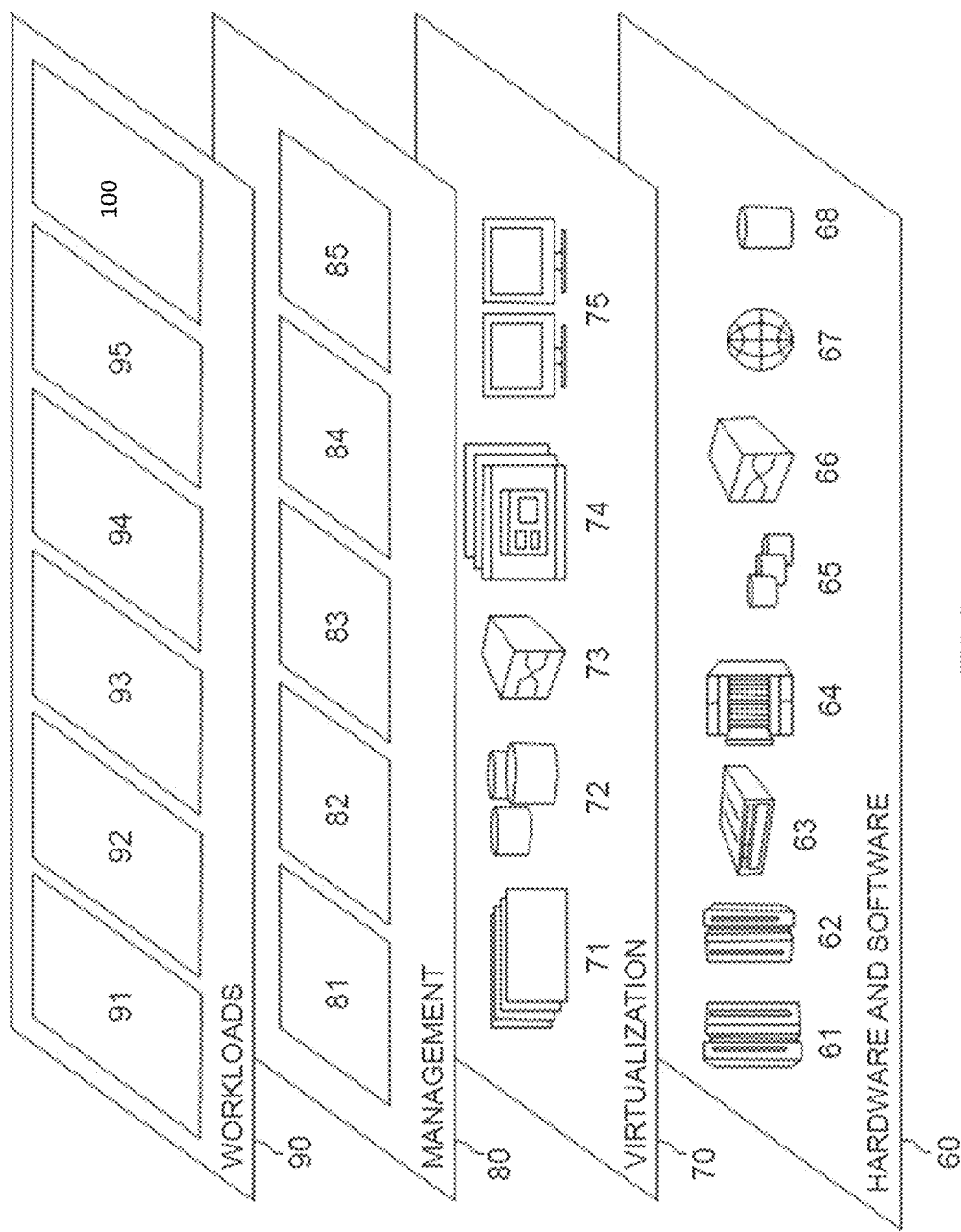
FIG. 15 depicts abstraction model layers according to an embodiment of the present invention.

Although as shown in FIGS. 13-15 and as described later, the computer system/server 12 is exemplarily shown in cloud computing node 10 as a general-purpose computing device which may execute in a layer the key-value pair compression system 100 (FIG. 15), it is noted that the present invention can be implemented outside of the cloud environment.

The key-value pair compression system 100 receives key-value pairs 107. Key-value pairs 107 include a key that uniquely identifies data. For example, a key could be a person's name and the data could be all their information on a particular website. Thus, when looking up the data associated with the key in the memory data storage area 106, the system would look up the key and then access the data.

Figure 11:
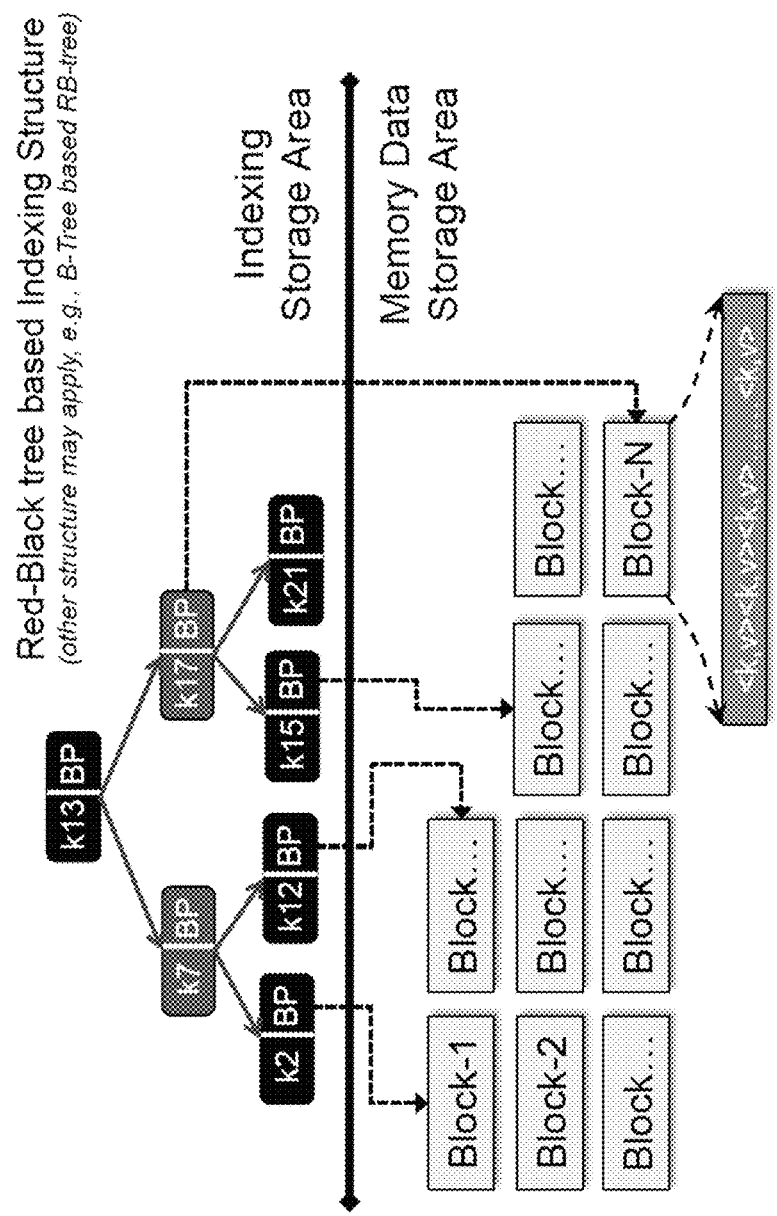
FIG. 11 exemplarily shows an illustration of creating blocks in the memory data storage device 105.

The key-value pair identification device 101 identifies each key-value pair and sorts the key-value pairs 107 in a particular order. For example, as shown in FIG. 11, the key-value pair identification device identifies a key of the key-value pairs 107 from "K2" to "K21", and sorts all key-value pairs in numerical order therebetween. That is to say, if 10,000 key-value pairs 107 were input into the key-value pair compression system 100, the key-value pair identification device 101 would identify and sort the key-value pairs 107 from 1 to 10,000.

The key-value pair division device 102 receives the key-value pairs 107 from the key-value pair identification device 101 and divides the total number of key-value pairs 107 into segments. The segments are preferably equal such that the segments can be converted into blocks that use an equal amount of memory. Also, the block size is dynamic in that the user can decide the size of the blocks to group the key-value pairs. Also, the block size can be based on a dynamic threshold of a size of the space available in the memory data storage area 106 such that when the size of the block is greater than or less than the threshold (i.e., in an inserting request or a DELETION request), the blocks can be combined or split to more effectively use the memory data storage area 106. The compression system 100 can be tailored to individual client requirements since the dynamic threshold is based on the size of the space available in the memory data storage area 106.

The block creation device 103 receives the segments of key-value pairs from the key-value pair division device 102 and labels each segment as a "block" or "group". It should be noted that "block" and "group" can be used interchangeably and merely represent a collection of sorted key-value pairs segments. For example, as shown in FIG. 11, if there are 10 segments, there can be 10 blocks labeled "block 1", "block 2" . . . "block 10". The block creation device 103 labels a first key-value pair and a last key-value pair within the block. That is, the block creation device 103 can label a block containing key-value pairs "K7" to "K17" as having the first key of "K7" and the last key as "K17" such that a user can later search the blocks using the range of the keys from "K7" to "K17".

More plainly stated, if the blocks in FIG. 11 are "K2", "K5", "K7", "K9", "K12", "K13", "K14", "K15", "K16", "K17", "K18", "K19", and "K21" and the associated values are such that partitioning the key set into roughly-equal-size blocks leads to the following grouping: (K2 K5) (K7 K9) (K12) (K13 K14) (K15 K16) (K17 K18 K19) (K21). It should be noted that not all keys exist in the whole range in that there may have been deletions, or insertions out of order, leading to gappy distributions.

Whether each index node mentions both the first and last keys, and just the first key (as shown in FIG. 11), is an implementation choice. The last key is not strictly necessary; any key less than the first key in the next index block would be looked up in the previous block. But if the distribution is extremely gappy, and the storage cost of a second key entry in the index node is justified, a key that falls in a gap between two blocks can be seen to be absent without having to decompress any block. If no last key is mentioned, a dummy index node holding an upper bound on keys is needed; the associated block pointer would be null.

Each block may consist of a header that holds an uncompressed Bloom Filter, followed by the compressed content. In a gappy distribution a Bloom Filter provides a quick indication that a given key is not present. If that indication is not given, the key may still be absent, but the block has to be decompressed at least to the extent that it's internal directory can be consulted.

Figure 12:
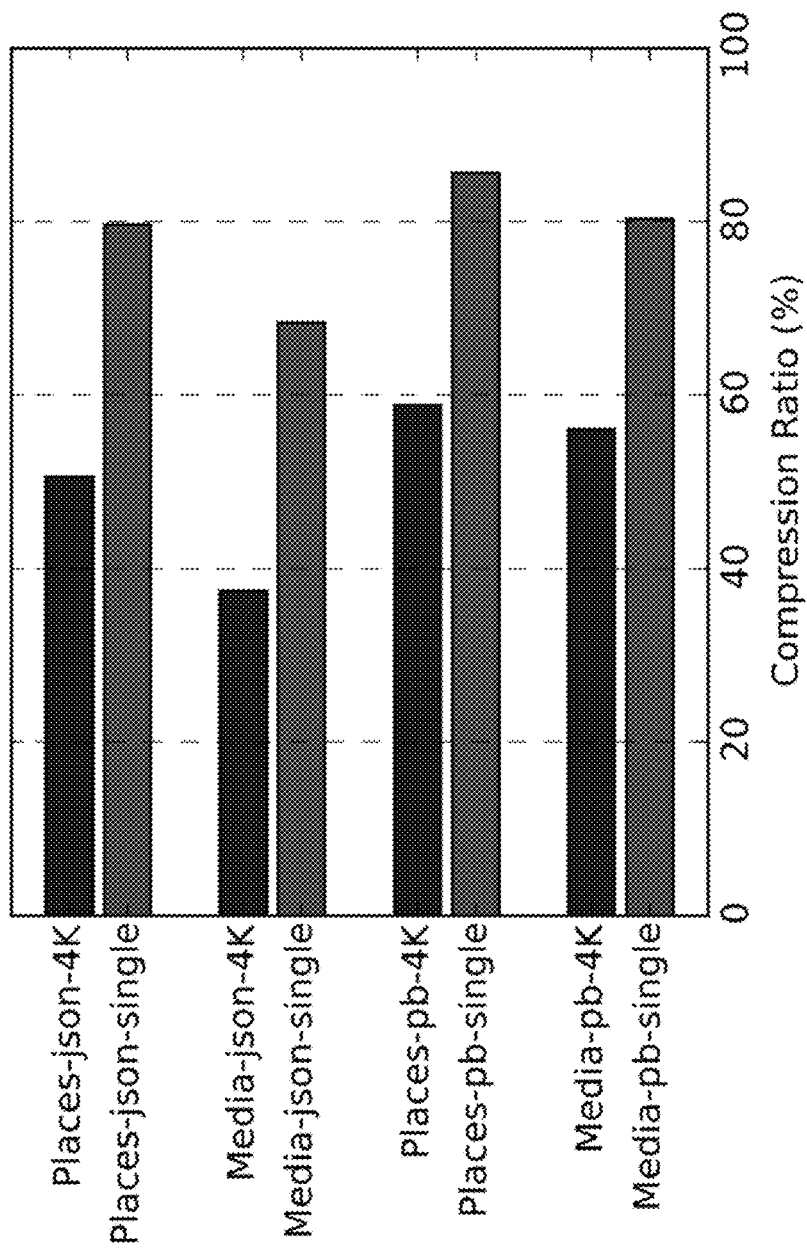
FIG. 12 exemplarily shows an illustration of compression results of the claimed invention compared to conventional methods.

The block compression device 104 receives each block created by the block creation device 103 and compresses the blocks. The memory storage device 105 receives the compressed blocks and stores the compressed blocks in the memory data storage area 106. In this manner, they key-value pairs are stored in ranges within the blocks instead of being stored individually and compressed as a whole data set in the memory data storage area 106. Thus, the compression of the key-value pairs 107 in the blocks is advantageous to conventional techniques as shown in FIG. 12.

Furthermore, since the key-value pairs 107 are stored in blocks, when the user attempts to UPDATE/GET/INSERT/DELETE key-value pairs 107 (as will be described in detail later), a block needs to be decompressed instead of the entire data set of key-value pairs stored in the memory data storage area 106.

Figure 2:
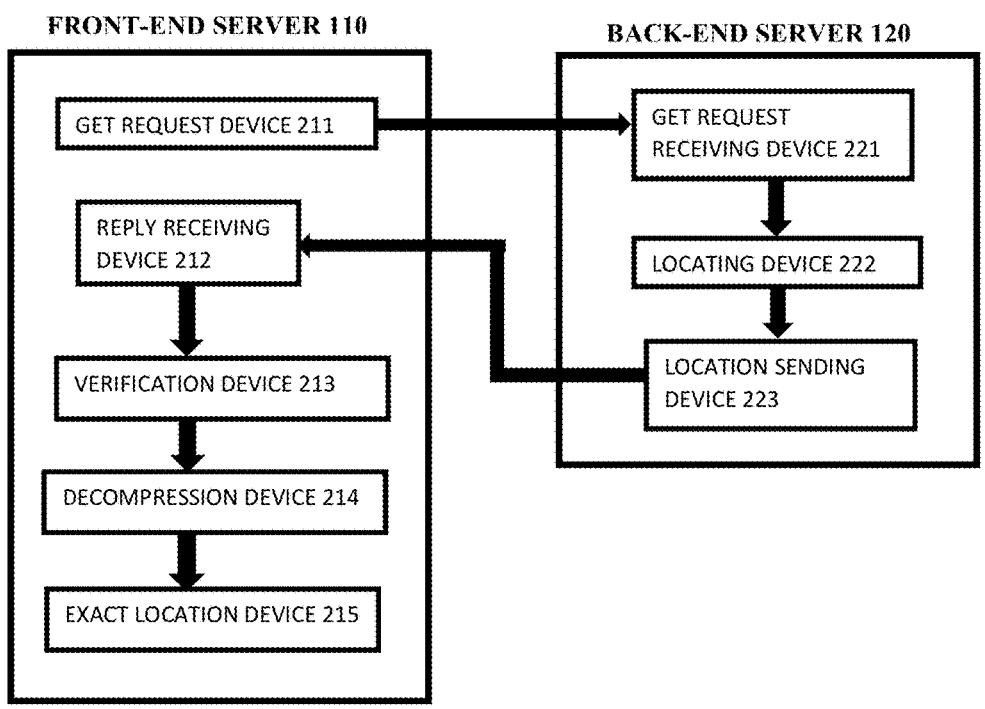
FIG. 2 exemplarily shows a block diagram illustrating a configuration of a front-end server 110 and a back-end server 120 operating a GET request within a memory storage area 106.

FIG. 2 exemplarily shows a block diagram illustrating a configuration of a front-end server 110 and a back-end server 120 operating a GET request within the memory data storage area 106. The front-end server 110 refers to a user side terminal and the back-end server 120 refers to the memory data storage area 106.

The front-end server 110 includes a GET request device 211, a reply receiving device 212, a verification device 213, a decompression device 214, and an exact location device 215.

The back-end server 120 includes a GET request receiving device 221, a locating device 222, and a location sending device 223.

The GET request device 211 receives a request from a user to get a key-value pair. The GET request device 211 sends the GET request to the GET request receiving device 221 of the back-end server 120.

The locating device 222 receives the GET request from the GET request receiving device 221 and locates the block in the memory data storage area 106 that contains the requested key of the key-value pair based on the indexing of the block. That is, the locating device 222 locates the block that the key is located in by using the range associated with each block and checking whether the key of the key-value pair requested is within the range of the first key and last key of the block. In other words, if the key being located is "K18", it would fall within the block having the first key of "K17" and the last key of "K21". However, if the key being located is "K22", the key would fall outside of the range of the block having the first key of "K15" and the last key of "K21" such that the locating device 222 would proceed to the next block to find the "K22" key.

It should be noted that each locating function described herein with reference to FIGS. 2-9 can locate the block containing the key of the key-value pair based on searching the plurality of blocks using the key of the desired key-value pair so as to find a block that the key of the desired key-value pair falls between the range of the first key and the last key of the block, or anything that precedes the first key in the next block, if the index node does not identify the last key covered by it.

The location sending device 223 receives the block which the key of the key-value pair is located in from the locating device 222 and sends the entire block to reply receiving device 212 of the front-end server 120. In this manner, the back-end server 120 off-loads the decompression of the block to the front-end server 110.

The verification device 213 verifies if a block is received by the reply receiving device 212. That is, if a block was not received since the key does not exist in the memory data storage area, the verification device 213 responds to the user informing that there is no key for the key-value pair to be returned for the request.

If the verification device 213 verifies that a block is received, the decompression device 214 decompresses the entire block such that each key-value pair of the key-value pairs 107 stored in the block are readable.

The exact location device 215 locates the key-value pair using the key within the decompressed key-value pairs 107 of the block requested by the user and outputs the key-value pair to the user.

Figure 3:
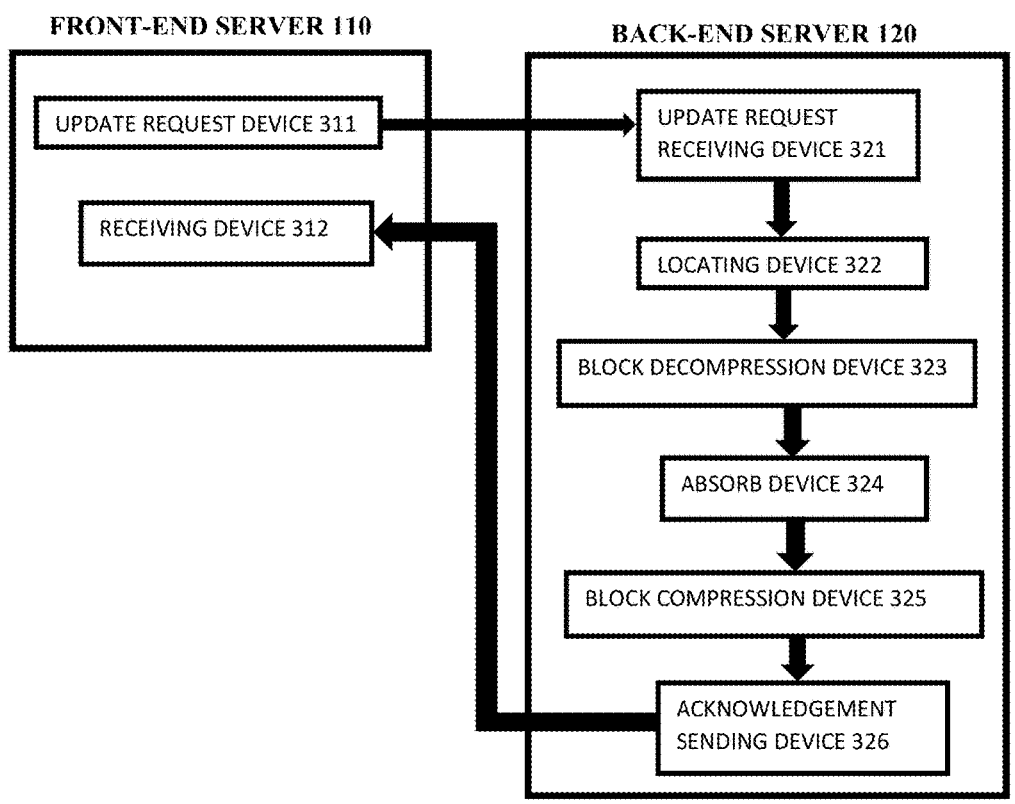
FIG. 3 exemplarily shows a block diagram illustrating a configuration of a front-end server 110 and a back-end server 120 operating an UPDATE request within the memory storage area 106.

FIG. 3 exemplarily shows a block diagram illustrating a configuration of a front-end server 110 and a back-end server 120 operating an UPDATE request within the memory data storage area 106.

The front-end server 110 includes an UPDATE request device 311 and a receiving device 312.

The back-end server 120 includes an UPDATE request receiving device 321, a locating device 322, a block decompression device 323, an absorb device 324, a block compression device 325, and an acknowledgement sending device 326.

The UPDATE request device 311 receives a request from a user to update a key-value pair. The UPDATE request device 311 sends the UPDATE request to the UPDATE request receiving device 321 of the back-end server 120.

The locating device 322 receives the update request from the UPDATE request receiving device 321 and locates the block in the memory data storage area 106 that contains the requested key based on the indexing of the block. That is, the locating device 322 locates the block that the key is located in by using the range associated with each block and checking whether the key of the key-value pair requested is within the range of the first key and last key of the block.

The block decompression device 323 receives the block that the key is located in from the locating device 322 and decompresses the block that the key-value pair is located in.

The absorb device 324 absorbs the new data into the key-value pair within the block such that the key-value pair is updated.

Once the new data is absorbed into the key-value pair within the block, the block compression device 325 compresses the block with the updated key-value pair data and the acknowledgement sending device 326 sends an acknowledgement to the receiving device 312 of the front-end server 110 to notify the user that the key-value pair has been updated.

Since only the block that contains the key-value pair is decompressed by the block decompressions device 323 in the back-send server 120, the speed at which the key-value pairs 107 are updated is much greater than the conventional systems which decompress the entire key-value pair database in order to update one-key value.

Figure 4:
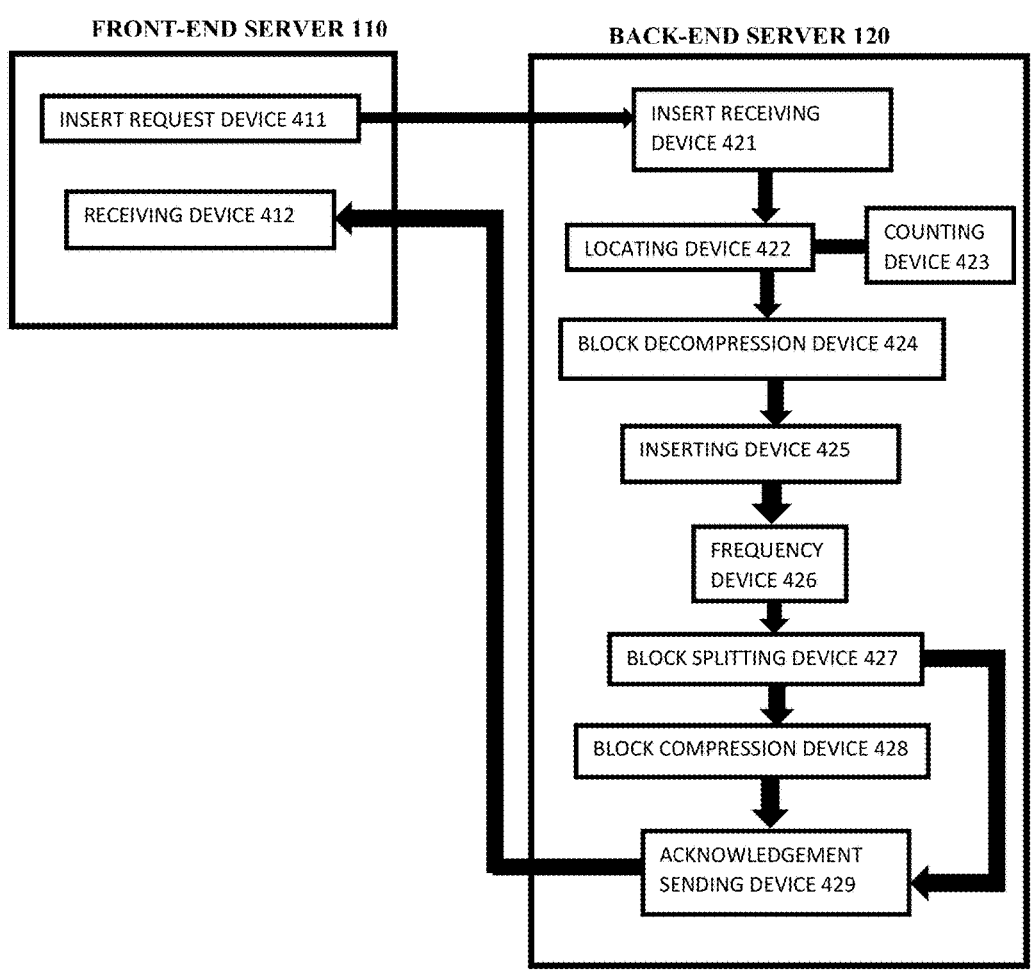
FIG. 4 exemplarily shows a block diagram illustrating a configuration of a front-end server 110 and a back-end server 120 operating an INSERT request within the memory storage area 106.

FIG. 4 exemplarily shows a block diagram illustrating a configuration of a front-end server 110 and a back-end server 120 operating an INSERT request within the memory data storage area 106.

The front-end server 110 includes an INSERT request device 411 and a receiving device 412.

The back-end server 120 includes an INSERT request receiving device 421, a locating device 422, a counting device 423, a block decompression device 424, an inserting device 425, a frequency device 426, a block splitting device 427, a block compression device 428, and an acknowledgement sending device 429.

The INSERT request device 411 receives a request from a user to insert a new key-value pair within a block. The INSERT request device 411 sends the INSERT request to the INSERT request receiving device 421 of the back-end server 120.

The locating device 422 receives the insert request from the INSERT request receiving device 421 and locates the block in the memory data storage area 106 that contains the requested key based on the indexing of the block. That is, the locating device 422 locates the block that the key is located in by using the range associated with each block and checking whether the new key of the new key-value pair requested is within the range of the first key and last key of the block.

At this time, the counting device 423 counts how many times that particular block has been accessed to have a key-value pair inserted therein based on how many times the locating device 422 located a specific block.

The block decompression device 424 receives the block that the new key-value pair is to be inserted in from the locating device 422 and decompresses the block that the key-value pair is to be inserted in.

The inserting device 425 inserts the new key-value pair into the key-value pair sequence within the block such that new the key-value pair is indexed within the block.

The frequency device 426 checks the number of times that the specific block is located based on the output of the counting device 423.

The block splitting device 427 splits the block into multiple blocks if the insertion of the new key-value pairs results in the block being greater in size than the dynamic threshold. That is, if the block is greater than the dynamic threshold, the block splitting device 427 splits the block into two separate blocks (i.e., a first new block and a second new block) and identifies the new range of the first key and the last key of the key-value pairs in the first and second new blocks.

Based on the frequency device 426 checking the number of times that the specific block is located, the block either proceeds to be compressed by the compression device 428 or proceeds to create a cache file to store the block. That is, the more frequent the specific block is located, the speed of the insertion would be increased if the block was stored in the cache file instead of having to decompress and compress the block each time it is accessed. The frequency device 426 decides whether to output the block to the cache file or to the block compression device 428 based on a comparison between the calculated time lost from decompressing and compressing, the increase in memory used by using the cache file, and the frequency in which the specific block is located.

The acknowledgement sending device 429 sends an acknowledgement to the receiving device 412 of the front-end server 110 to notify the user that the new key-value pair has been inserted.

Figure 5:
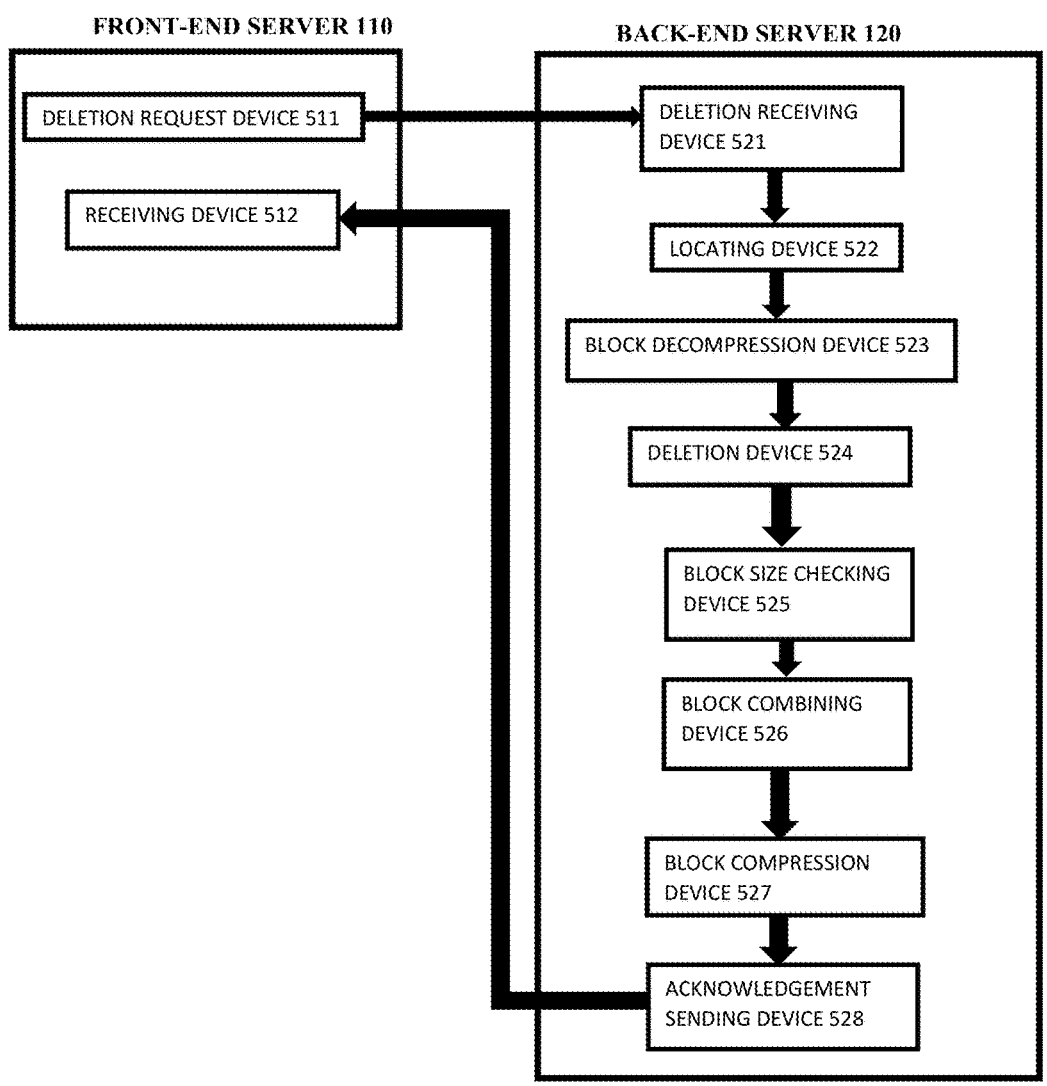
FIG. 5 exemplarily shows a block diagram illustrating a configuration of a front-end server 110 and a back-end server 120 operating a DELETION request within the memory storage area 106.

FIG. 5 exemplarily shows a block diagram illustrating a configuration of a front-end server 110 and a back-end server 120 operating a DELETION request within the memory data storage area 106.

The front-end server 110 includes a DELETION request device 511 and a receiving device 512.

The back-end server 120 includes a DELETION request receiving device 521, a locating device 522, a block decompression device 523, a DELETION device 524, a block size checking device 525, a block combining device 526, a block compression device 527, and an acknowledgement sending device 528.

The DELETION request device 511 receives a request from a user to delete a key-value pair within a block. The DELETION request device 511 sends the DELETION request to the DELETION request receiving device 521 of the back-end server 120.

The locating device 522 receives the DELETION request from the DELETION request receiving device 521 and locates the block in the memory data storage area 106 that contains the requested key based on the indexing of the block. That is, the locating device 522 locates the block that the key is located in by using the range associated with each block and checking whether the key of the key-value pair requested is within the range of the first key and last key of the block until it finds the block containing the requested key-value pair.

The block decompression device 523 receives the block that the key-value pair is located in from the locating device 522 and decompresses the block that the key-value pair is located in.

The DELETION device 524 deletes the key-value pair in the key-value pair sequence within the block and flags the block to signify that a key-value pair has been deleted from the block.

The block size checking device 525 checks a size of the block after the deletion of the key-value pair to determine if the size of the block is below a threshold input by the user or a dynamic threshold based on the memory data storage area 106.

If the size of the block is below the threshold, the block combining device 526 combines the block which the key-value was deleted from with a different block to form a new block to eliminate blocks that are below a threshold size and reduce the storage area used in the memory data storage area 106. Also, the block combining device 526 re-assigns the range of keys within the block by assigning the first key and the last key such that the key-value pairs can be located by the locating device 522 based on a new range of keys in the newly formed block.

The block compression device 527 compresses the block with the deleted key-value pair data and the acknowledgement sending device 528 sends an acknowledgement to the receiving device 512 of the front-end server 110 to notify the user that the key-value pair has been deleted.

Figure 6:
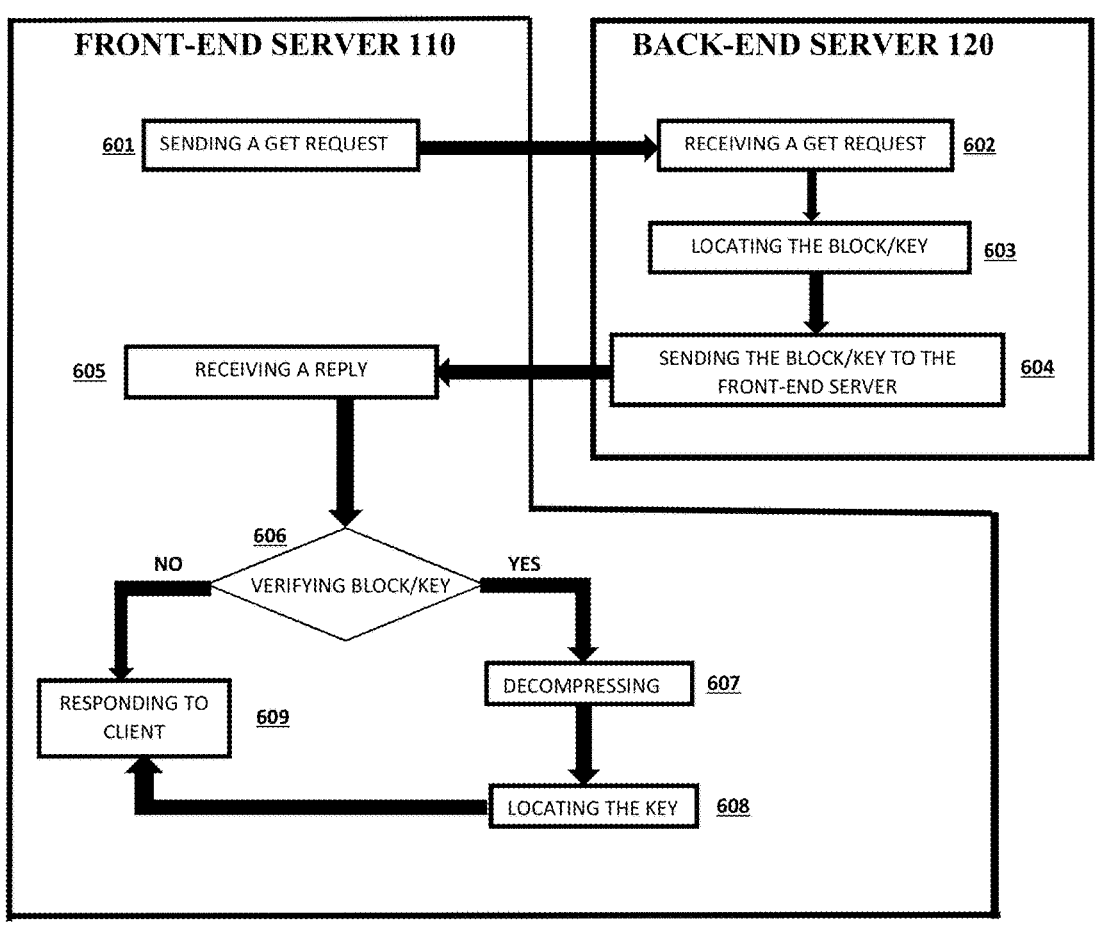
FIG. 6 exemplarily shows a high level flow chart for a GET request method 600 within the memory storage area 106.

FIG. 6 shows a high level flow chart for a GET request method 600 within the memory data storage area 106.

Step 601 sends a GET request from the front-end server 110 to the back-end server 120 to GET a key-value pair.

Step 602 receives the GET request in the back-end server 120.

Step 603 locates the block that contains the key of the key-value requested in the GET request of step 601.

Step 604 sends the block to the front-end server 110. It should be noted that step 604 sends the entire block to the front-end server 110 without any further action taken by the back-end server 120 (i.e., decompression).

Step 605 receives the block from the back-end server 120 and step 606 verifies if a block was received in step 605. If a block was not received (NO), then step 609 responds to the client to inform the client that no block contains the key-value pair.

If a block was received by the front-end server 110 (YES), step 607 decompresses the block.

Step 608 locates the specific key-value pair using the key within the decompressed block on the front-end server 110 and step 609 responds to the client with the key-value pair data.

The GET request method 600 off-loads the decompressing to the front-end server 110 such that compression of the block after getting the key-value requested is not needed in the back-end server 120, thus reducing the load on the back-end server 120.

Figure 7:
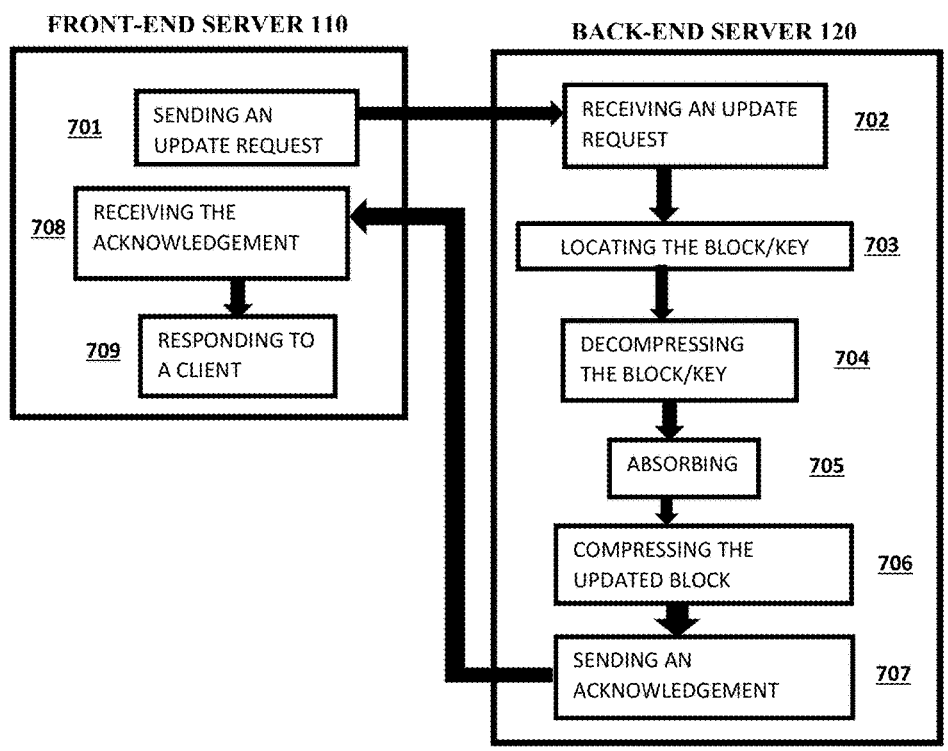
FIG. 7 exemplarily shows a high level flow chart for an UPDATE request method 700 within the memory storage area 106.

FIG. 7 shows a high level flow chart for an UPDATE request method 700 within the memory data storage area 106.

Step 701 sends an UPDATE request from the front-end server 110 to the back-end server 120 to update a key-value pair.

Step 702 receives the UPDATE request in the back-end server 120.

Step 703 locates the block that contains the key of the key-value pair requested in the UPDATE request of step 701.

Step 704 decompresses the block containing the key of the key-value pair requested in the UPDATE request.

Step 705 absorbed the update to the key-value pair requested by the client into the key-value pair.

Step 706 compresses the block with the updated key-value pair and step 707 sends an acknowledgement to the front-end server 110.

Step 708 receives the acknowledgement that the UPDATE request of step 701 has been completed and step 709 responds to the client confirming that the UPDATE request has been completed.

Figure 8:
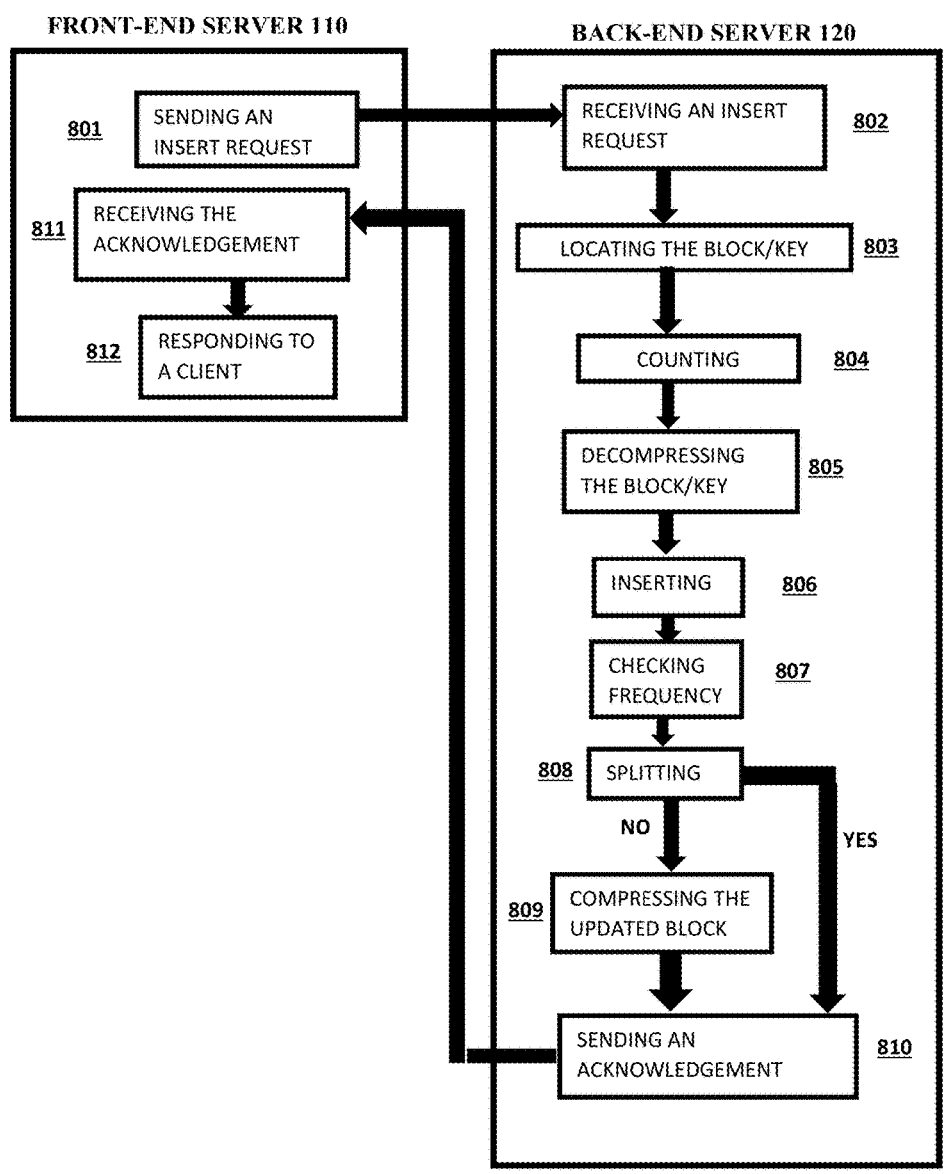
FIG. 8 exemplarily shows a high level flow chart for an INSERT request method 800 within the memory storage area 106.

FIG. 8 shows a high level flow chart for an INSERT request method 800 within the memory data storage area 106.

Step 801 sends an INSERT request from the front-end server 110 to the back-end server 120 to insert a new key-value pair into an existing block.

Step 802 receives the INSERT request in the back-end server 120.

Step 803 locates the block that contains the key of the key-value pair requested in the UPDATE request of step 801.

Step 804 counts the number of times that a specific block is located in step 803.

Step 805 decompresses the block containing the key of the key-value pair requested in the INSERT request.

Step 806 inserts the key-value pair into the segment of key-value pairs 107 within the block that has been decompressed such that the key-value is arranged in order in the block and indexed. That is, the new key-value pair is inserted between the first key and the last key of the block.

Step 807 checks the frequency that a specific block has been located based on the integer output by step 804.

Step 808 splits the block into multiple blocks if the size of the block after the insertion of the new key-value pair is greater than a threshold value.

After step 808, if the frequency that the specific block has been located is greater than a predetermined value (YES), step 809 is skipped, and a cache memory is created to store the frequently accessed block.

After step 808, if the frequency that the specific block has been located is less than a predetermined value (NO), then step 809 compresses the updated block with the newly inserted key-value pair.

Then, step 810 sends an acknowledgement to the front-end server 110.

Step 811 receives the acknowledgement that the INSERT request of step 801 has been completed and step 812 responds to the client confirming that the INSERT request has been completed.

Figure 9:
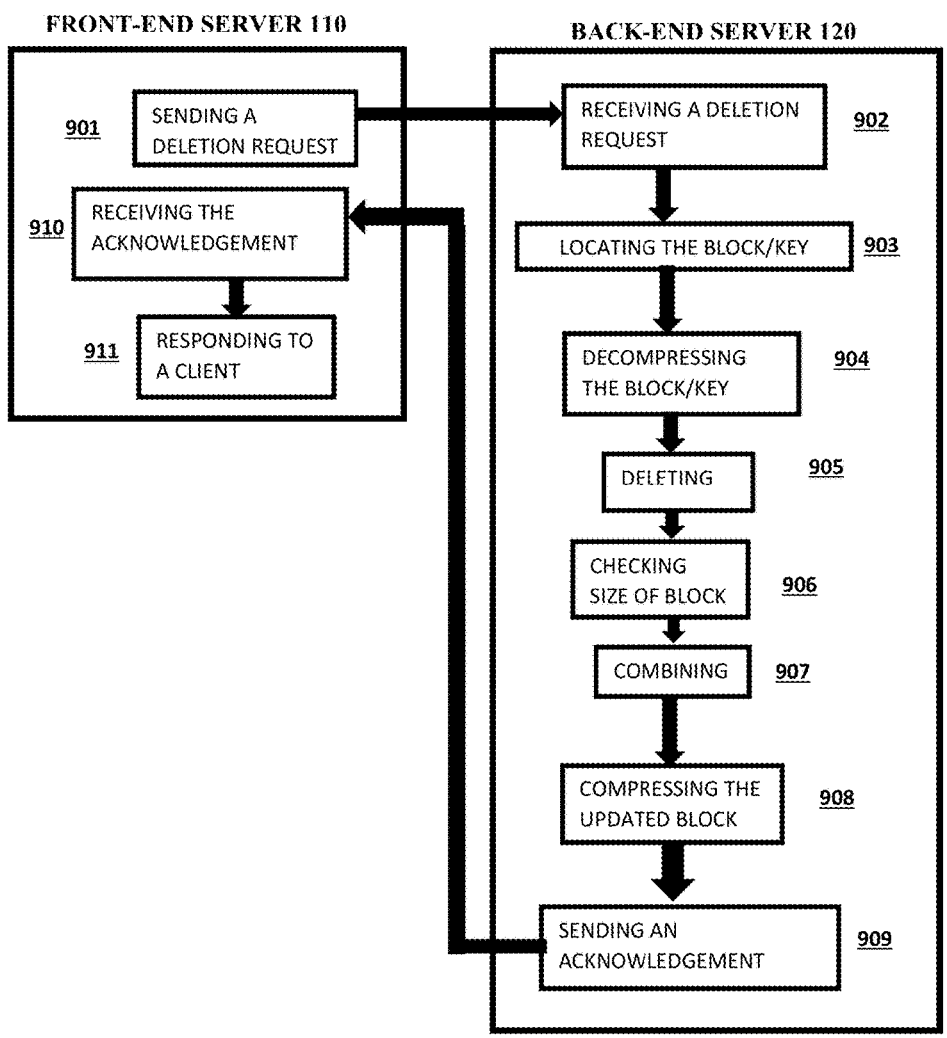
FIG. 9 exemplarily shows a high level flow chart for a DELETION request method 900 within the memory storage area 106.

FIG. 9 shows a high level flow chart for a DELETION request method 900 within the memory data storage area 106.

Step 901 sends a DELETION request from the front-end server 110 to the back-end server 120 to delete a key-value pair from a block.

Step 902 receives the DELETION request in the back-end server 120.

Step 903 locates the block that contains the key of the key-value pair requested in the DELETION request of step 901.

Step 904 decompresses the block containing the key-value pair requested in the DELETION request.

Step 905 deletes the key-value pair from the segment of key-value pairs 107 within the block that has been decompressed and flags the block indicated that a key-value pair has been deleted.

Step 906 checks the size of the block after the key-value pair has been deleted and outputs the size of the block to the combining step 907.

The combining step 907 combines the key-value pairs of the block in which the key-value was deleted with the key-value pairs of a second block when the size of the block in which the key-value pair was deleted falls below a threshold value.

Step 908 compresses the block with the deleted key-value pair.

Then, step 909 sends an acknowledgement to the front-end server 110.

Step 910 receives the acknowledgement that the DELETION request of step 901 has been completed and step 911 responds to the client confirming that the DELETION request has been completed.

Figure 10:
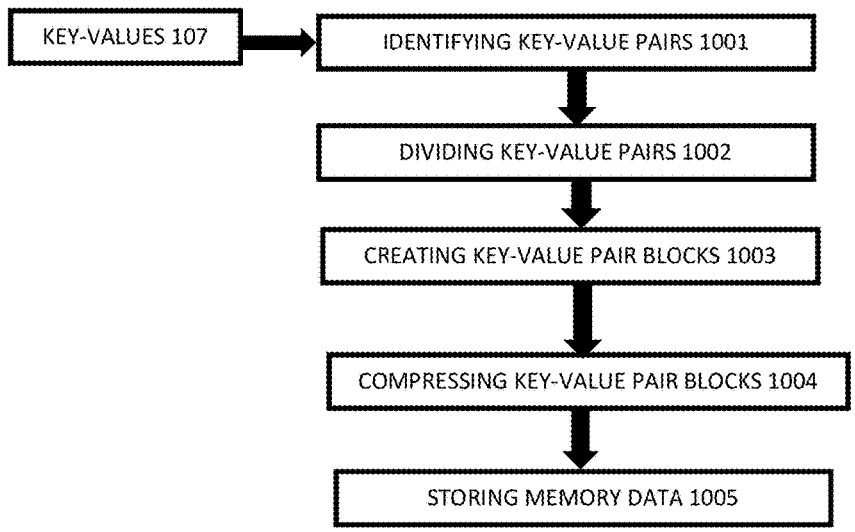
FIG. 10 exemplarily shows a high level flow chart for a key-value pair compression method 1000.

FIG. 10 shows a high level flow chart for a key-value pair compression method 1000.

The key-value pair compression method 1000 receives key-value pairs 107.

Step 1001 identifies each key-value pair and sorts the key-value pairs 107 in a particular order. For example, as shown in FIG. 11, step 1001 identifies a key of the key-value pairs 107 from "K2" to "K21", and sort all key-value pairs in numerical order therebetween. That is to say, if 10,000 key-value pairs 107 were input into the key-value compression system 100, step 1001 identifies and sorts the key-value pairs 107 from 1 to 10,000.

Step 1002 receives the key-value pairs 107 from step 1001 and divides the total number of key-value pairs 107 into segments according to the number of key-value pairs 107. The segments are preferably equal such that the segments can be converted into blocks. Also, the block size is dynamic in that the user can decide the size of the blocks to group the key-value pairs. Further, the block size can be based on a dynamic threshold of a size of the space available in the memory data storage area 106 such that when the size of the block is greater than or less than the threshold (i.e., in an inserting request or a DELETION request), the blocks can be combined or split to more effectively use the memory data storage area 106. The compression method 1000 can be tailored to individual client requirements since the dynamic threshold is based on the size of the space available in the memory data storage area 106.

Step 1003 receives the segments of key-value pairs from step 1002 and labels each segment as a "block" or "group". It should be noted that "block" and "group" can be used interchangeably and merely represent a collection of sorted key-value pairs segments. For example, if there are 20 segments, there can be 20 blocks labeled "block 1", "block 2"... "block 20". Step 1003 labels a first key and a last key within the block. That is, step 1003 can label a block containing key-value pairs "K20-BP" to "K40-BP" as having the first key of "K20" and the last key as "K40" such that a user can later search the blocks using the range from "K20" to "K40". This process is done for each block.

Step 1004 receives each block created by step 1003 and compresses the blocks. Step 1005 receives the compressed blocks and stores the compressed blocks in the memory data storage area 106. In this manner, they key-value pairs are stored in ranges within the blocks instead of being stored individually and compressed as a whole data set in the memory data storage area 106. Thus, the compression of the key-value pairs 107 in the blocks is advantageous to conventional techniques as shown in FIG. 12.

Furthermore, since the key-value pairs 107 are stored in blocks, when the user attempts to UPDATE/GET/INSERT/delete key-value pairs 107 (as will be described in detail later), only a block needs to be decompressed instead of the entire data set of key-value pairs.

In view of the foregoing and other problems, disadvantages, and drawbacks of the aforementioned background art, it is desirable to provide a new and improved compression system which can reduce memory consumption. More particularly, it is desirable to provide a compression system for organizing key-value pairs into groups and compressing the groups of key-value pairs to reduce the memory consumption of in-memory data stores.

An exemplary aspect of the disclosed invention provides a system, method, and non-transitory recording medium for compressing a group of key-value pairs to reduce the memory consumption of in-memory data stores which can provide a technical solution to the technical problem in the conventional approaches by at least a lookup of indexed data within a range (i.e., within a group of a plurality of key-value pairs) which a key-value pairs can exist instead of conducting an exact lookup reading each key-value pair and compresses the group of key-value pairs to increase memory store space and reduce the space overhead imposed by managing the metadata for each key-value instead of decompressing each key-value pair every time a system function is utilized (i.e., GET, INSERT, DELETE, UPDATE, etc.)

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 13, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 14, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the key-value compression system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A method for compressing a group of key-value pairs from a key-value store, the method comprising:
    dividing the group of key-value pairs into a plurality of segments of a dynamic size comprising a collection of records, the key-value pairs being stored in the key-value store where each row of the key-value store comprises a key-value format;
    grouping the plurality of segments together such that the dynamic size of the plurality of segments have an approximately equal usage;
    creating a plurality of blocks that each have an equal memory size greater than a greatest size of the approximately equal memory usage of the plurality of segments and labeling a first key-value pair and a last key-value pair in each block,
    pairing each of the grouped plurality of segments to a block of the plurality of blocks such that the approximately equal memory usage of the plurality of segments is less than the equal memory size of the paired block;
    compressing each block of the plurality of blocks including compressing an uncompressed version of the combined key and value together as the key-value pairs ranging from the first key-value pair to the last key-value pair of the block;
    decompressing a block of the plurality of blocks to insert a new key-value pair;
    inserting the new key-value pair into the block when the new key-value pair occurs between the first key-value pair and the last key-value pair in the block;
    splitting the block into a first block and a second block based on a size of the block after the new key-value pair is inserted when the size of the memory usage of the paired segments exceeds the equal memory size of the corresponding block;
    sending, from a front-end server, another request to delete a key-value pair;
    locating a block of the plurality of blocks to delete the key-value pair in a memory data storage area of a back-end server;
    decompressing a block of the plurality of blocks;
    deleting the key-value pair from the block;
    checking a size of the block to judge whether the size of the block is approximately equal to the approximately equal memory usage;
    combining the block with a second block to make a new block if the size of the block is less than a threshold value difference between the equal memory size and a size of the approximately equal memory usage of the corresponding segment after the deleting; and
    compressing the new block or the block,
    wherein the splitting and the combining dynamically split and merge neighboring compressed blocks after each of the inserting and the deleting, and
    wherein the compressing compresses the uncompressed version of the combined key and value together as the key-value pairs in a single step having one compression performed on the combined key and value.

2. The method of claim 1, further comprising storing the compressed blocks in the memory data storage area of the back-end server.

3. The method of claim 2, further comprising sending, from the back-end server, a compressed block of the compressed blocks to the front-end server.

4. The method of claim 2, further comprising:
    sending, from the back-end server, a compressed block of the compressed blocks to the front-end server; and
    decompressing the compressed block in the front-end server.

5. The method of claim 1, wherein a size of the segments dynamically changes according to a user input.

6. The method of claim 1, wherein a size of the segments dynamically changes according to a threshold value of the memory data storage area of the back-end server.

7. The method of claim 1, further comprising:
sending, from the front-end server, a first request for a key-value pair;
locating a block of the plurality of blocks that contains the key-value pair in the memory data storage area of the back-end server; and
sending, from the back-end server, the block of the plurality of blocks that contains the key-value pair to the front-end server.

8. The method of claim 7, further comprising:
verifying that the block sent from the back-end server contains the key-value pair requested in said sending the first request;
decompressing the block; and
locating the key-value pair requested in said sending the first request within the decompressed key-value pairs of the block.

9. The method of claim 1, further comprising:
decompressing a block of the plurality of blocks that contains the key-value pair;
absorbing a second request into the key-value pair; and
compressing the block of the plurality of blocks that absorbed the second request.

10. A non-transitory computer-readable recording medium recording a compression program for compressing a group of key-value pairs from a key-value store, the program causing a computer to perform:
dividing the group of key-value pairs into a plurality of segments of a dynamic size comprising a collection of records, the key-value pairs being stored in the key-value store where each row of the key-value store comprises a key-value format;
grouping the plurality of segments together such that the dynamic size of the plurality of segments have an approximately equal memory usage;
creating a plurality of blocks that each have ant equal memory size greater than a greatest size of the approximately equal memory usage of the plurality of segments and labeling a first key-value pair and a last key-value pair in each block,
pairing each of the grouped plurality of segments to a block of the plurality of blocks such that the approximately equal memory usage of the plurality of segments is less than the equal memory size of the paired block;
compressing each block of the plurality of blocks including compressing an uncompressed version of the combined key and value together as the key-value pairs ranging from the first key-value pair to the last key-value pair of the block;
decompressing a block of the plurality of blocks to insert a new key-value pair;
inserting the new key-value pair into the block when the new key-value pair occurs between the first key-value pair and the last key-value pair in the block;
splitting the block into a first block and a second block based on a size of the block after the new key-value pair is inserted when the size of the memory usage of the paired segments exceeds the equal memory size of the corresponding block;
sending, from a front-end server, another request to delete a key-value pair;
locating block of the plurality of blocks to delete the key-value pair in a memory data storage area of a back-end server;
decompressing a block of the plurality of blocks;
deleting the key-value pair from the block;
checking a size of the block to judge whether the size of the block is approximately equal to the approximately equal memory usage;
combining the block with a second block to make a new block if the size of the block is less than a threshold value difference between the equal memory size and a size of the approximately equal memory usage of the corresponding segment after the deleting; and
compressing the new block or the block,
wherein the splitting and the combining dynamically split and merge neighboring compressed blocks after each of the inserting and the deleting, and
wherein the compressing compresses the uncompressed version of the combined key and value together as the key-value pairs in a single step having one compression performed on the combined key and value.

11. A key-value pair compression system for compressing a group of key-value pairs from a key-value store, the system comprising:
a processor; and
a memory configured to cause the processor to perform:
dividing the group of key-value pairs into a plurality of segments of a dynamic size comprising a collection of records, the key-value pairs being stored in the key-value store where each row of the key-value store comprises a key-value format;
grouping the segments together such that the dynamic size of the plurality of segments have an approximately equal memory usage;
creating a plurality of blocks that each have an equal memory size greater than a greatest size of the approximately equal memory usage of the plurality of segments and labeling a first key-value pair and a last key-value pair in each block,
pairing each of the grouped plurality of segments to a block of the plurality of blocks such that the approximately equal memory usage of the plurality of segments is less than the equal memory size of the paired block;
compressing each block of the plurality of blocks including compressing an uncompressed version of the combined key and value together as the key-value pairs ranging from the first key-value pair to the last key-value pair of the block;
decompressing a block of the plurality of blocks to insert a new key-value pair;
inserting the new key-value pair into the block when the new key-value pair occurs between the first key-value pair and the last key-value pair in the block;
splitting the block into a first block and a second block based on a size of the block after the new key-value pair is inserted when the size of the memory usage of the paired segments exceeds the equal memory size of the corresponding block;
sending, from a front-end server, another request to delete a key-value pair;
locating a block of the plurality of blocks to delete the key-value pair in a memory data storage area of a back-end server;
decompressing a block of the plurality of blocks;
deleting the key-value pair from the block;

checking a size of the block to judge whether the size of the block is approximately equal to the approximately equal memory usage;

combining the block with a second block to make a new block if the size of the block is less than a threshold value difference between the equal memory size and a size of the approximately equal memory usage of the corresponding segment after the deleting; and compressing the new block or the block, wherein the splitting and the combining dynamically split and merge neighboring compressed blocks after each of the inserting and the deleting, and wherein the compressing compresses the uncompressed version of the combined key and value together as the key-value pairs in a single step having one compression performed on the combined key and value.

* * * * *